US008718919B2

(12) United States Patent
Leineweber et al.

(10) Patent No.: US 8,718,919 B2
(45) **Date of Patent: *May 6, 2014**

(54) METHOD AND APPARATUS FOR LANE RECOGNITION FOR A VEHICLE

(75) Inventors: Thilo Leineweber, Shanghai (CN); Werner Urban, Vaihingen/Enz (DE); Ruediger-Walter Henn, Weil der Stadt (DE); Goetz Braeuchle, Reichartshausen (DE); Martin Heinebrodt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 641 days.

This patent is subject to a terminal disclaimer.

(21) Appl. No.: 12/785,256

(22) Filed: May 21, 2010

(65) Prior Publication Data

US 2011/0040468 A1 Feb. 17, 2011

Related U.S. Application Data

(63) Continuation-in-part of application No. 10/571,369, filed as application No. PCT/DE2004/002067 on Sep. 16, 2004, now Pat. No. 7,801,659, application No. 12/785,256, which is a continuation-in-part of application No. 10/512,593, filed as application No. PCT/DE02/04540 on Dec. 11, 2002, now Pat. No. 7,765,066.

(30) Foreign Application Priority Data

Apr. 23, 2003 (DE) ................................. 102 18 010
Sep. 30, 2003 (DE) ................................. 103 45 802

(51) Int. Cl.
*G08G 1/16* (2006.01)
*B60W 30/16* (2012.01)

(52) U.S. Cl.
USPC ............. 701/301; 701/96; 340/435; 340/903; 340/913; 342/104; 342/118; 180/167; 180/170

(58) Field of Classification Search
USPC ............ 701/301, 300, 117, 96; 340/436, 903, 340/435, 913; 180/204, 167, 170; 250/208.1; 315/77; 342/104, 118
See application file for complete search history.

(56) References Cited

U.S. PATENT DOCUMENTS 4,049,961 A 9/1977 Marcy
4,401,181 A 8/1983 Schwarz
(Continued)

FOREIGN PATENT DOCUMENTS

DE 101 15 551 10/2001
DE 100 18 873 12/2001
(Continued)

*Primary Examiner* — Tuan C. To
(74) *Attorney, Agent, or Firm* — Kenyon & Kenyon LLP

(57) ABSTRACT

A method and an apparatus for lane recognition for a vehicle that is equipped with an adaptive distance and speed control system are provided, the adaptive distance and speed controller having conveyed to it, using an object detection system, the relative speed of detected objects, a variable for determining the lateral offset of the detected objects with respect to the longitudinal vehicle axis, and the speed of the host vehicle. From the relative speed of the objects and the host-vehicle speed, a determination is made as to whether an object is oncoming, stationary, or moving in the same direction as the host vehicle. In combination with the calculated lateral offset of the detected object with respect to the longitudinal vehicle axis, the number of lanes present and the lane currently being traveled in by the host vehicle are determined.

5 Claims, 4 Drawing Sheets

(56) References Cited

U.S. PATENT DOCUMENTS

| | | | | |
|---|---|---|---|---|
| 4,970,653 | A | 11/1990 | Kenue | |
| 5,483,453 | A | 1/1996 | Uemura et al. | |
| 5,517,412 | A | 5/1996 | Unoura | |
| 5,555,312 | A | 9/1996 | Shima et al. | |
| 5,642,093 | A | 6/1997 | Kinoshita et al. | |
| 5,699,040 | A | 12/1997 | Matsuda | |
| 5,890,083 | A | 3/1999 | Franke et al. | |
| 5,926,117 | A | 7/1999 | Gunji et al. | |
| 5,938,707 | A | 8/1999 | Uehara | |
| 5,979,581 | A | 11/1999 | Ravani et al. | |
| 5,986,601 | A * | 11/1999 | Sugimoto | 342/70 |
| 5,999,874 | A | 12/1999 | Winner et al. | |
| 6,037,975 | A * | 3/2000 | Aoyama | 348/113 |
| 6,057,754 | A | 5/2000 | Kinoshita et al. | |
| 6,081,756 | A | 6/2000 | Mio et al. | |
| 6,185,492 | B1 | 2/2001 | Takeshi et al. | |
| 6,211,784 | B1 * | 4/2001 | Nishide | 340/568.1 |
| 6,226,389 | B1 | 5/2001 | Lemelson et al. | |
| 6,230,093 | B1 | 5/2001 | Michi et al. | |
| 6,268,803 | B1 * | 7/2001 | Gunderson et al. | 340/903 |
| 6,282,483 | B1 | 8/2001 | Yano et al. | |
| 6,311,119 | B2 * | 10/2001 | Sawamoto et al. | 701/96 |
| 6,321,159 | B1 | 11/2001 | Nohtomi et al. | |
| 6,343,247 | B2 | 1/2002 | Jitsukata et al. | |
| 6,347,274 | B2 | 2/2002 | Kuramochi et al. | |
| 6,353,788 | B1 | 3/2002 | Baker et al. | |
| 6,356,206 | B1 | 3/2002 | Takenaga et al. | |
| 6,370,474 | B1 | 4/2002 | Hiwatashi et al. | |
| 6,373,378 | B1 | 4/2002 | Ewerhart et al. | |
| 6,385,539 | B1 | 5/2002 | Wilson et al. | |
| 6,438,491 | B1 | 8/2002 | Farmer | |
| 6,473,678 | B1 | 10/2002 | Satch et al. | |
| 6,487,501 | B1 | 11/2002 | Jeon | |
| 6,571,176 | B1 * | 5/2003 | Shinmura et al. | 701/301 |
| 6,580,987 | B2 | 6/2003 | Sadano et al. | |
| 6,614,469 | B1 | 9/2003 | Kato et al. | |
| 6,631,324 | B2 * | 10/2003 | Okamura et al. | 701/301 |
| 6,642,502 | B2 * | 11/2003 | Iwaki | 250/214 R |
| 6,691,003 | B1 | 2/2004 | Stortz et al. | |
| 6,772,062 | B2 | 8/2004 | Lasky et al. | |
| 6,803,736 | B1 | 10/2004 | Hommel et al. | |
| 6,937,165 | B2 | 8/2005 | Rogers | |
| 6,944,543 | B2 | 9/2005 | Prakah-Asante et al. | |
| 6,977,630 | B1 | 12/2005 | Donath et al. | |
| 7,102,496 | B1 * | 9/2006 | Ernst et al. | 340/436 |
| 7,124,027 | B1 | 10/2006 | Ernst et al. | |
| 7,187,947 | B1 * | 3/2007 | White et al. | 455/556.1 |
| 7,375,728 | B2 | 5/2008 | Donath et al. | |
| 7,510,038 | B2 | 3/2009 | Kaufman et al. | |
| 2001/0014846 | A1 * | 8/2001 | Sawamoto et al. | 701/96 |
| 2001/0018641 | A1 | 8/2001 | Kodaka et al. | |
| 2001/0025211 | A1 | 9/2001 | Shiral et al. | |
| 2002/0007239 | A1 | 1/2002 | Matsumoto et al. | |
| 2002/0080019 | A1 | 6/2002 | Saton et al. | |
| 2002/0107637 | A1 * | 8/2002 | Okamura et al. | 701/301 |
| 2002/0138193 | A1 | 9/2002 | Miyahara | |
| 2002/0147534 | A1 * | 10/2002 | Delcheccolo et al. | 701/45 |
| 2002/0184236 | A1 | 12/2002 | Donath et al. | |
| 2002/0198632 | A1 | 12/2002 | Breed et al. | |
| 2003/0045982 | A1 | 3/2003 | Kondo et al. | |
| 2003/0062769 | A1 | 4/2003 | Matsumoto et al. | |
| 2003/0070848 | A1 | 4/2003 | Hasegawa et al. | |
| 2003/0085835 | A1 * | 5/2003 | Matsui et al. | 342/70 |
| 2003/0105578 | A1 * | 6/2003 | Takenaga et al. | 701/117 |
| 2003/0109980 | A1 | 6/2003 | Kojima et al. | |
| 2003/0128182 | A1 | 7/2003 | Donath et al. | |
| 2003/0154016 | A1 * | 8/2003 | Manaka | 701/96 |
| 2003/0156015 | A1 * | 8/2003 | Winner et al. | 340/425.5 |
| 2003/0218563 | A1 * | 11/2003 | Miyahara | 342/70 |
| 2004/0085197 | A1 * | 5/2004 | Watanabe et al. | 340/435 |
| 2004/0090117 | A1 | 5/2004 | Dudeck et al. | |
| 2004/0143381 | A1 | 7/2004 | Regensburger et al. | |
| 2004/0193374 | A1 | 9/2004 | Hac et al. | |
| 2005/0174223 | A1 | 8/2005 | Egami et al. | |
| 2005/0228588 | A1 | 10/2005 | Braeuchie et al. | |

FOREIGN PATENT DOCUMENTS

| | | | | |
|---|---|---|---|---|
| EP | 806336 | | | 11/1997 |
| JP | 2001-039326 | | | 2/2001 |
| JP | 2001-048036 | | | 2/2001 |
| JP | 2002099998 | A | * | 4/2002 |
| JP | 2002104116 | A | * | 4/2002 |
| JP | 2002274303 | A | * | 9/2002 |

* cited by examiner

METHOD AND APPARATUS FOR LANE RECOGNITION FOR A VEHICLE

CROSS-REFERENCE TO RELATED APPLICATIONS

This application is a continuation-in-part of, and claims priority under 35 U.S.C. §120 to, U.S. patent application Ser. No. 10/571,369 filed on Jan. 19, 2007, which was a National Stage Application of PCT International Application No. PCT/DE2004/002067, filed Sep. 16, 2004, which claims priority under 35 U.S.C. §119 to German Patent Application No. DE 103 45 802.6 filed Sep. 30, 2003, all of which are incorporated herein by reference in their entirety.

This application is also a continuation-in-part of, and claims priority under 35 U.S.C. §120 to, U.S. patent application Ser. No. 10/512,593 filed on May 11, 2005, which was a National Stage Application of PCT International Application No. PCT/DE02/04540, filed Dec. 11, 2002, which claims priority under 35 U.S.C. §119, to German Patent Application No. DE 102 18 010.5 filed Apr. 23, 2003, all of which are incorporated herein by reference in their entirety.

FIELD OF THE INVENTION

The present invention relates to a method and an apparatus for lane recognition for a vehicle that is equipped with an adaptive distance and speed control system, the adaptive distance and speed controller making a determination as to whether an object is oncoming, stationary, or moving in the same direction as the host vehicle, and in combination with the calculated lateral transverse offset of the object with respect to the longitudinal vehicle axis, the number of lanes present and the lane currently being traveled in by the host vehicle are determined.

BACKGROUND INFORMATION

The publication "Adaptive Cruise Control System: Aspects and Development Trends," by Winner, Witte, Uhler and Lichtenberg, made public at the SAE International Congress and Exposition in Detroit, Feb. 26-29, 1996, discloses an adaptive distance and speed controller that emits radar waves and receives the partial radar waves reflected from objects. From the received partial radar waves, the distance, relative speed, and azimuth angle of the detected object with respect to the longitudinal vehicle axis can be determined. The speed of the host vehicle is also conveyed to the adaptive distance and speed controller. If a preceding vehicle is detected, the speed of the host vehicle is regulated so as to establish a constant distance; and if a preceding vehicle is not present, the speed of the host vehicle is controlled so as to regulate it to a constant set speed defined by the driver.

Published German patent document DE 101 15 551 discloses a model-assisted lane allocation system for vehicles in which a lane allocation of successive vehicles is performed, the lane allocation being accomplished in model-assisted fashion by way of a frequency distribution of the transverse offsets of sensed radar objects. This method can additionally be used to detect misalignment of the sensor.

SUMMARY

The present invention provides a method and an apparatus with which, with the aid of data of an object detection system, the distance, azimuth angle, and relative speed of detected objects, as well as the host-vehicle speed, can be detected, and as a function of those data the number of lanes present on the road currently being traveled, as well as the lane currently being traveled in on the road, can be detected.

Advantageously, in a context of right-hand traffic, travel on a single-lane road is recognized when objects are detected which exhibit a negative relative speed that is of greater magnitude than the host-vehicle speed, and which exhibit a left-side lateral transverse offset that is of lesser magnitude than a predetermined lane width value; and/or objects are detected which exhibit a negative relative speed that approximately corresponds in magnitude to the host-vehicle speed, and which exhibit a right-side lateral transverse offset that is of lesser magnitude than a predetermined lane width value; and/or objects are detected which exhibit a negative relative speed that approximately corresponds in magnitude to the host-vehicle speed, and which exhibit a left-side lateral transverse offset that is of greater magnitude than a predetermined lane width value.

It is furthermore advantageous that in a context of right-hand traffic, travel on a multi-lane road is recognized when objects are detected which exhibit a negative relative speed that is of greater magnitude than the host-vehicle speed, and which exhibit a left-side lateral transverse offset that is of greater magnitude than a predetermined lane width value.

It is furthermore advantageous that utilization of the left lane of a multi-lane road is recognized when objects are detected which exhibit a negative relative speed that approximately corresponds in magnitude to the host-vehicle speed, and which exhibit a left-side lateral transverse offset that is of lesser magnitude than a predetermined lane width value; and/or objects are detected which exhibit either a positive relative speed or a negative relative speed whose magnitude is approximately between zero and the host-vehicle speed, and exhibit a right-side lateral transverse offset.

It is furthermore advantageous that utilization of a center lane of a multi-lane road is recognized when objects are detected which exhibit a negative relative speed that approximately corresponds in magnitude to the host-vehicle speed, and which exhibit a lateral transverse offset of any kind that is of greater magnitude than a predetermined lane width value; and/or objects are detected which exhibit either a positive relative speed or a negative relative speed whose magnitude is approximately between zero and the host-vehicle speed, and exhibit a lateral transverse offset of any magnitude.

It is furthermore advantageous that utilization of the right lane of a multi-lane road is recognized when objects are detected which exhibit a negative relative speed that approximately corresponds in magnitude to the host-vehicle speed, and which exhibit a right-side lateral transverse offset that is of lesser magnitude than a predetermined lane width value; and/or objects are detected which exhibit either a positive relative speed or a negative relative speed whose magnitude is approximately between zero and the host-vehicle speed, and exhibit a left-side lateral transverse offset.

It is particularly advantageous that when travel on a single-lane road is recognized, the portion of the field of view of the object detection system in which the detected objects can be taken into consideration for control purposes is expanded toward greater left- and right-side lateral transverse offsets.

It is particularly advantageous that when utilization of the left lane of a multi-lane road is recognized, the portion of the field of view of the object detection system in which the detected objects can be taken into consideration for control purposes is expanded toward greater left-side lateral transverse offsets.

Advantageously, upon recognition that the right lane of a multi-lane road is being utilized, the portion of the field of view of the object detection system in which the detected objects can be taken into consideration for control purposes is expanded toward greater right-side lateral transverse offsets.

It is furthermore advantageous that the number of lanes identified, and the recognition of the lane currently being traveled in, become effective only when the identified result remains unchanged for a predetermined period of time. This has the advantage that only upon definite recognition of the number of lanes present, or upon definite recognition of the lane currently being used, is that recognition conveyed to the controller, and corresponding changes are made to the portion of the field of view of the object detection system in which the detected objects can be taken into consideration for control purposes, or to the control parameters.

It is furthermore advantageous that the predetermined lane width value is between 3.4 meters and 3.8 meters.

It is furthermore advantageous that the object detection system encompasses a radar sensor, a laser sensor, an ultrasonic sensor, a video sensor, or a combination thereof.

An example implementation of the method according to the present invention is provided in the form of a control element for a control device of an adaptive distance and speed control system of a motor vehicle. Stored in the control element is a program that is executable on a computing device, e.g., a microprocessor or signal processor, and is suitable for carrying out the method according to the present invention. In this case, therefore, the invention is implemented by way of a program stored in the control element. An electric storage medium may be used for the storage in the control element, for example a read-only memory.

Within the scope of the present invention, the relative speed Vrel of the detected object ascertained by object detection system is defined so that a negative relative speed exists in the context of an oncoming vehicle or an object that is moving in the same direction as host vehicle but exhibits a lower speed than the host vehicle. Positive relative speeds are accordingly defined such that these are moving objects that are moving in the same direction as host vehicle but at a higher speed, so that they are moving away from host vehicle. Objects having a negative relative speed are therefore objects considered in relation to the host vehicle, are moving toward the latter, and are therefore either oncoming vehicles or vehicles that are moving in the same direction as the host vehicle but at a lower absolute speed than the host vehicle.

DETAILED DESCRIPTION

Figure 1:
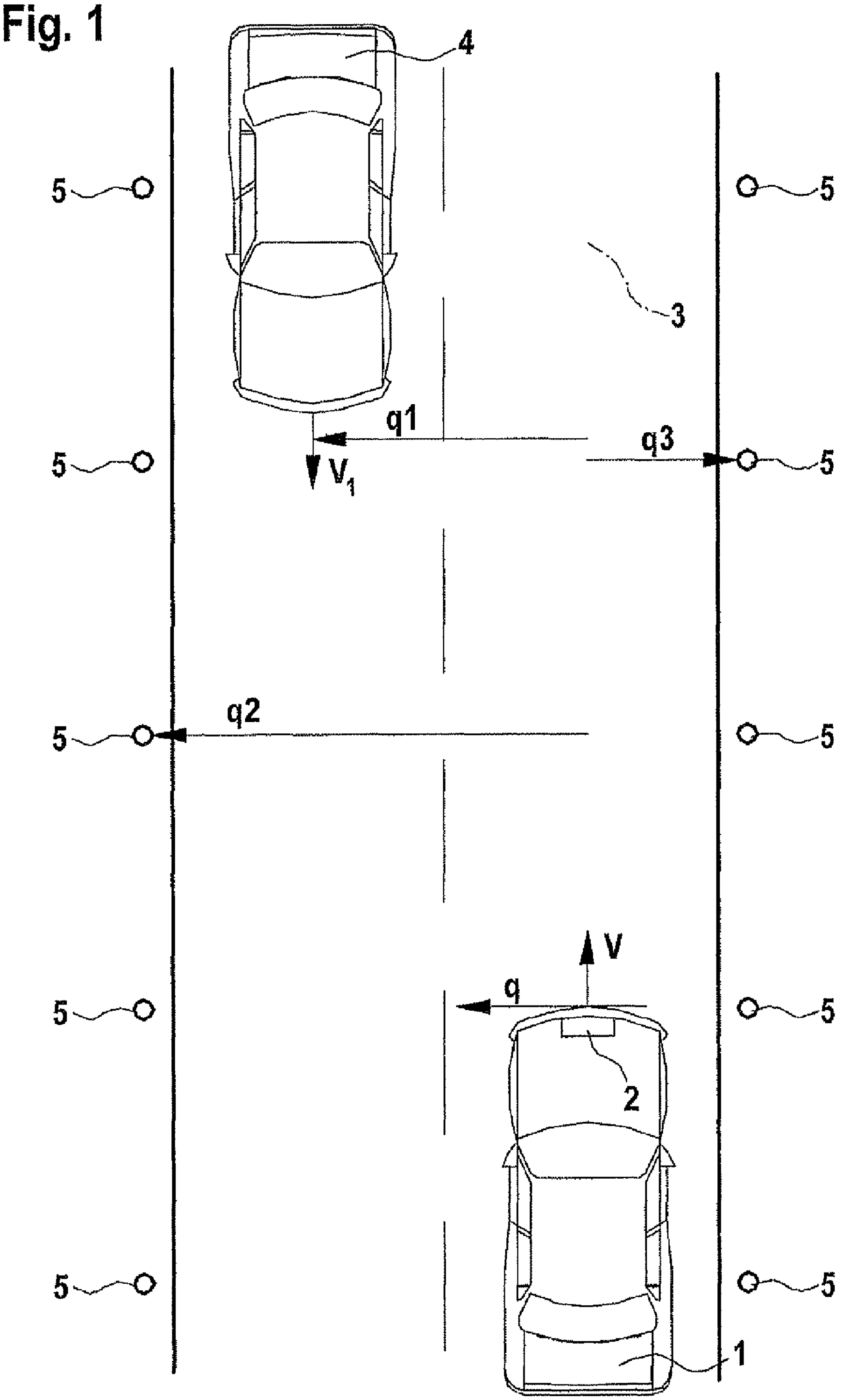
FIG. 1 shows a first example situation that may occur during vehicle operation according to the present invention.

FIG. 1 depicts a road on which one lane is provided for each direction of travel. Also apparent is host vehicle 1, which has an object detection system 2. This object detection system 2, which may include a radar, laser, ultrasonic, or video sensor as a combination thereof, ascertains the distance, relative speed, and azimuth angle of detected objects with respect to host vehicle 1. These ascertained data are conveyed to an adaptive distance and speed controller that regulates vehicle 1 as a function of the detected measured values. From a knowledge of the host-vehicle speed and of the relative speed of detected objects, the absolute speed of the detected objects can be ascertained. From the azimuth angle at which the object is detected and the object's distance, the so-called lateral transverse offset can also be ascertained. The lateral transverse offset is the smallest distance between the detected object and longitudinal vehicle axis 3. This lateral transverse offset can be further subdivided into right-side and left-side lateral transverse offsets, "right-side" and "left-side" referring to longitudinal vehicle axis 3 viewed in the motion direction of host vehicle 1. It is furthermore possible to associate with object detection system 2 a coordinate system that has, for example, a first axis v that is oriented parallel to longitudinal vehicle axis 3, as well as an axis q arranged orthogonally thereto for the lateral transverse offset, which in FIG. 1 depicts, for example, left-side lateral transverse offsets as positive q values and right-side lateral transverse offsets as negative q values. It is of course also possible to define the transverse offset axis q the other way around, so that right-side transverse offsets describe positive q values and left-side transverse offsets describe negative q values. In order to determine the number of lanes present in the host vehicle's travel direction, and to detect the lane currently being utilized, according to the present invention it is necessary to ascertain the lateral transverse offset of the detected objects as well as the absolute speed of the detected objects. For an oncoming vehicle 4, for example, the absolute speed V1 of oncoming vehicle 4 is determined from the relative speed Vrel measured therefor, and the host-vehicle speed V. The lateral transverse offset q1 for vehicle 4 is furthermore determined from the measured distance of oncoming vehicle 4 and the azimuth angle. Stationary objects 5 as well, for example those by the side of the road such as guardrails, roadside delimiters in the form of stanchions, traffic signs, or bridge abutments, are also detected as objects. Stationary objects are recognized, in particular, from the fact that the magnitude of the relative speed of the stationary objects corresponds approximately to the host-vehicle speed V of host vehicle 1. A left-side or right-side lateral transverse offset q2 or q3 is furthermore also ascertained for stationary objects. If, for example, an object 4 is detected which exhibits a negative relative speed Vrel that is of greater magnitude than host-vehicle speed V, an absolute speed V1 oriented oppositely to host-vehicle direction V can then be ascertained therefrom. If a left-side lateral transverse offset q1 that is of lesser magnitude than a predetermined lane width value fsb is furthermore ascertained for the detected object 4, travel on a one-lane road can thereby be recognized, as depicted by way of example in FIG. 1. The predetermined lane width value is a predefined value that represents approximately the width of one lane. This can be equal, for example, to between 3.4 m and 3.8 m. This covers lane widths that are usual, for example, on well-constructed main highways or expressways. If objects 5 are detected which exhibit a negative relative speed Vrel that approximately corresponds in magnitude to the host-vehicle speed, those objects 5 are then recognized as stationary objects. If those objects furthermore exhibit a right-side lateral transverse offset q3 that is of lesser magnitude than a predetermined lane width value fsb, these are then stationary objects on the right side of the road. If objects 5 are detected which exhibit a negative relative speed Vrel that approximately corresponds in magnitude to host-vehicle speed V, and which exhibit a left-side lateral transverse offset q2 that is of greater magnitude than a predetermined lane width value fsb, these are then stationary objects on the left side of the road. If stationary objects of this kind exhibiting the predefined lateral transverse offsets are recognized on the left or right side of the road, travel on a one-lane road can thereby also be detected.

Figure 2:
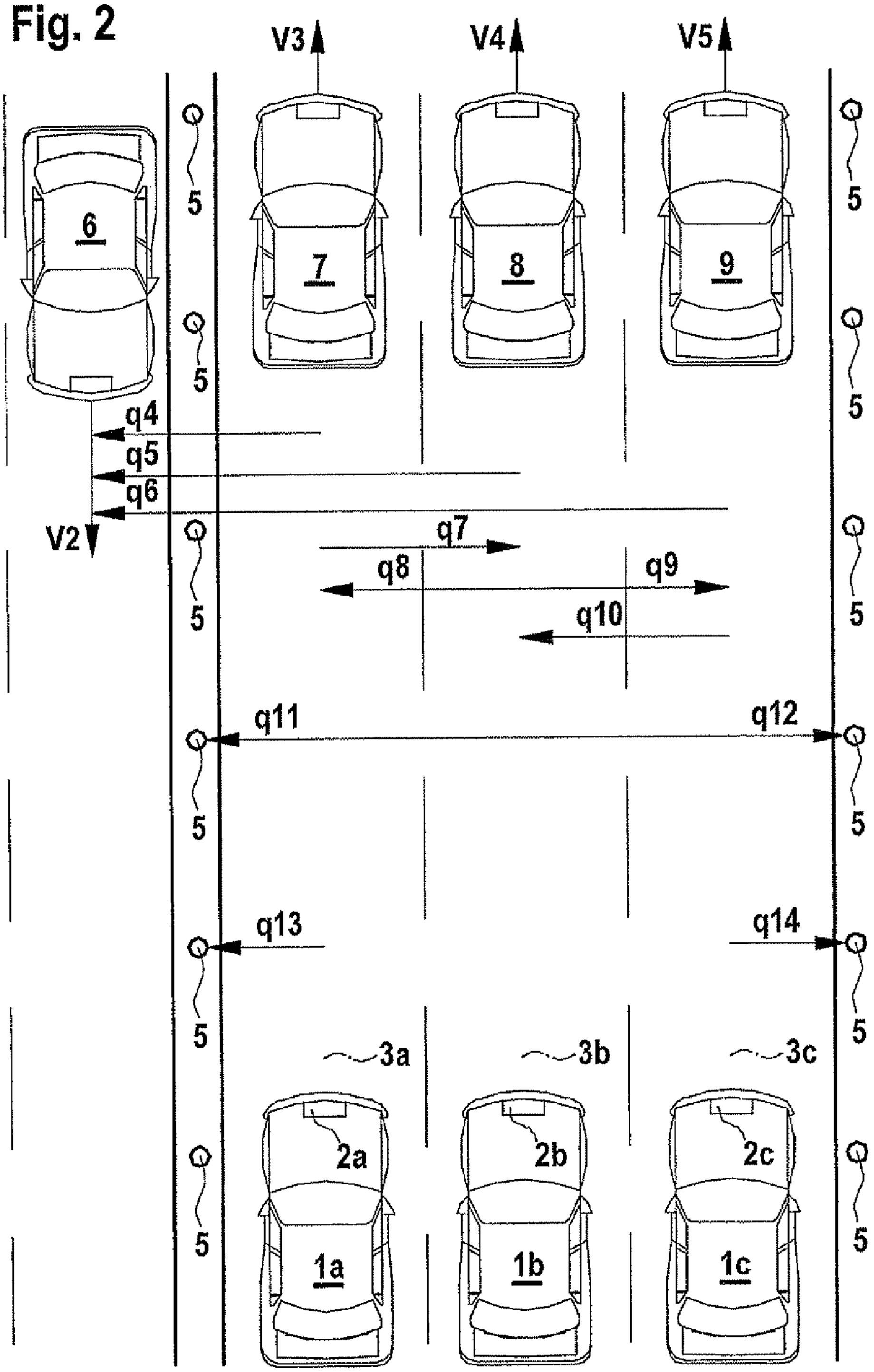
FIG. 2 shows a second example situation that may occur during vehicle operation according to the present invention.

FIG. 2 depicts, by way of example, travel on a multi-lane road. Three different situations are presented here: on the one hand, host vehicle 1*a* traveling in the left lane of a multi-lane road; furthermore, host vehicle 1*b* traveling in the center lane of a multi-lane road; and host vehicle 1*c* traveling in the right lane of a multi-lane road. Depicted for each of these three host-vehicle situations are respective vehicles 1*a*, 1*b*, 1*c* that each have an object detection system 2*a*, 2*b*, 2*c*. A longitudinal vehicle axis 3*a*, 3*b*, 3*c* is likewise shown for each of these driving situations. Also depicted are stationary objects 5 at the sides of the road, although it is not absolutely necessary that such stationary objects be provided. The situation may arise, for example, in which multi-lane roadways are present, but no stationary objects are present in the central region of the roadway. Also depicted by way of example is an oncoming vehicle 6 that is moving in the opposite travel direction lane at a speed V2. Additionally depicted, by way of example, are three preceding vehicles 7, 8, 9 in the left, center, and right lanes, respectively, moving at speeds V3, V4, V5. If, for example, during operation according to the present invention, an object 6 is detected which exhibits a negative relative speed Vrel that is of greater magnitude than host-vehicle speed V, it is then determined to be an oncoming vehicle. If a left-side lateral transverse offset q4, q5, q6 that is of greater magnitude than a predetermined lane width value fsb is furthermore ascertained for this oncoming vehicle, it can be concluded therefrom that vehicle 1 is on a multi-lane road in the left, center, or right lane, i.e., in situation 1*a*, 1*b*, or 1*c*.

If an object is detected which exhibits a negative relative speed Vrel that approximately corresponds in magnitude to the host-vehicle speed V, i.e., is a stationary object, and if the latter simultaneously exhibits a left-side lateral transverse offset q that is of lesser magnitude than a predetermined lane width value fsb, i.e., if a stationary object 5 having a left-side lateral transverse offset q13 has been detected, it can be concluded therefrom that host vehicle 1*a* is traveling in the left lane of a multi-lane road. If, furthermore, an object is detected which exhibits either a positive relative speed Vrel or a negative relative speed Vrel whose magnitude is approximately between zero and the host-vehicle speed V, this is then a preceding vehicle, as represented, e.g., by preceding vehicles 7, 8, 9. If a right-side lateral transverse offset q7 is ascertained with respect to this preceding vehicle, it can likewise be concluded therefrom that host vehicle 1*a* is traveling in the left lane of a multi-lane road. The AND association between the two conditions described above allows an unequivocal conclusion as to utilization of the left lane of a multi-lane road.

If object detection system 2 detects an object which exhibits a negative relative speed Vrel whose magnitude corresponds approximately to the host-vehicle speed V, i.e., if it is a stationary object, and if the object exhibits a lateral transverse offset q11, q12 of any kind that is of greater magnitude than a predetermined lane width value fsb, it can then be concluded therefrom that host vehicle 1*b* is in the center lane of a multi-lane road. If, additionally, an object is detected which exhibits either a positive relative speed Vrel or a negative relative speed Vrel whose magnitude is approximately between zero and the host-vehicle speed V, and moreover exhibits a lateral transverse offset of any kind, it is likewise possible to conclude therefrom that host vehicle 1*b* is traveling in the center lane of a multi-lane road. If object detection system 2 detects an object which exhibits either a negative relative speed Vrel whose magnitude corresponds approximately to the host-vehicle speed V, i.e., the object is a stationary object, and the object exhibits a right-side lateral transverse offset q14 that is of lesser magnitude than a predetermined lane width value fsb, it can be concluded therefrom that host vehicle 1*c* is traveling in the right lane of a multi-lane road. If, additionally, an object is detected which exhibits either a positive relative speed Vrel or a negative relative speed Vrel whose magnitude is approximately between zero and the host-vehicle speed V, i.e., it is a faster or slower preceding vehicle, and if that object simultaneously exhibits a left-side lateral offset q10, it can then be concluded therefrom that vehicle 1*c* is traveling in the right lane of a multi-lane road.

Figure 3:
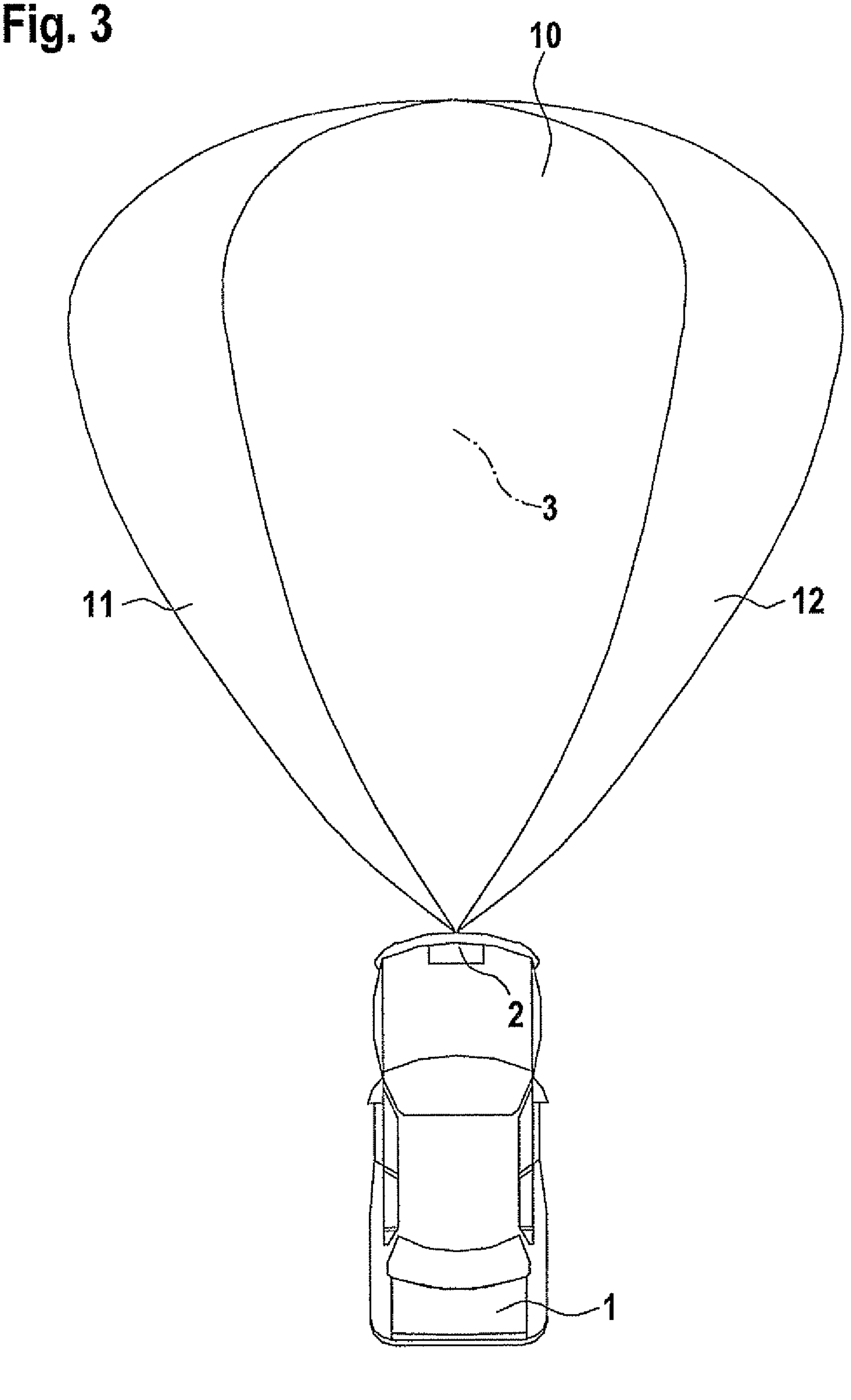
FIG. 3 shows an example sensor field of detection that can be expanded on both the left and the right side.

FIG. 3 depicts host vehicle 1 that is equipped at the front with an object detection system 2. Object detection system 2 has a sensor field of view (detection range) 10 that can detect moving or stationary objects located toward the front, sensor field of view 10 usually being oriented symmetrically with respect to longitudinal vehicle axis 3. The region in which objects can be detected by object detection system 2 is larger than the field of view of the sensor system. In conjunction with this invention, the field of view is to be understood to mean that only detected objects that are located within the field of view are evaluated and incorporated in terms of the adaptive distance and speed control system. Objects that are present outside the field of view but within the transmission and reception region of the sensor may therefore, because they lie outside the defined field of view, still not be evaluated for control purposes in terms of the distance and speed of host vehicle 1. According to the present invention it is possible to expand sensor field of view 10 on the left side by providing an expanded left-side field of view 11. An expanded right-side field of view 12 of object detection system 2 may correspondingly also be defined. The expansion of the portion of the object detection system's field of view in which the detected objects can be taken into consideration for control purposes can be covered, for example, by a very wide transmission and reception region of the detection system, and consideration can be activated only for objects present in the expanded fields of view. If it has been recognized on the basis of the detected objects that host vehicle 1 is traveling on a one-lane road, it is then furthermore possible to expand field of view 10 of object detection system 2 toward greater left-side and right-side lateral transverse offsets, by activating either expanded left-side field of view 11 or expanded right-side field of view 12 or both expanded fields of view 11, 12. The risk of adjacent-lane interference due to the expanded left-side and right-side fields of view is very low in the context of travel on a one-lane road, since only preceding vehicles are present in the host lane, oncoming vehicles in the adjacent lane, and stationary objects at the sides of the road. Adjacent-lane interference as a consequence of vehicles that are moving the same direction as host vehicle 1 but are traveling in adjacent lanes can be ruled out in the context of single-lane roads, and a very wide sensor field of view can therefore be activated. If utilization of the left lane of a multi-lane road is recognized on the basis of the detected objects, it is advantageous to expand field of view 10 of object detection system 2 only toward greater left-side lateral transverse offsets q, by activating only expanded left-side field of view 11 in addition to normal field of view 10. Because vehicles may be present in the right lane adjacent to host vehicle 1 and may influence the control behavior of the adaptive distance and speed controller in undesired fashion, expanded right-side field of view 12 should not be activated in this situation. If object detection system 2 has recognized on the basis of the detected objects that host vehicle 1 is traveling in the right lane of a multi-lane road, it is advantageous to expand field of view 10 toward greater right-side lateral transverse offsets q, by activating expanded right-side field of view 12 and deactivating expanded left-side field of view 11.

Figure 4:
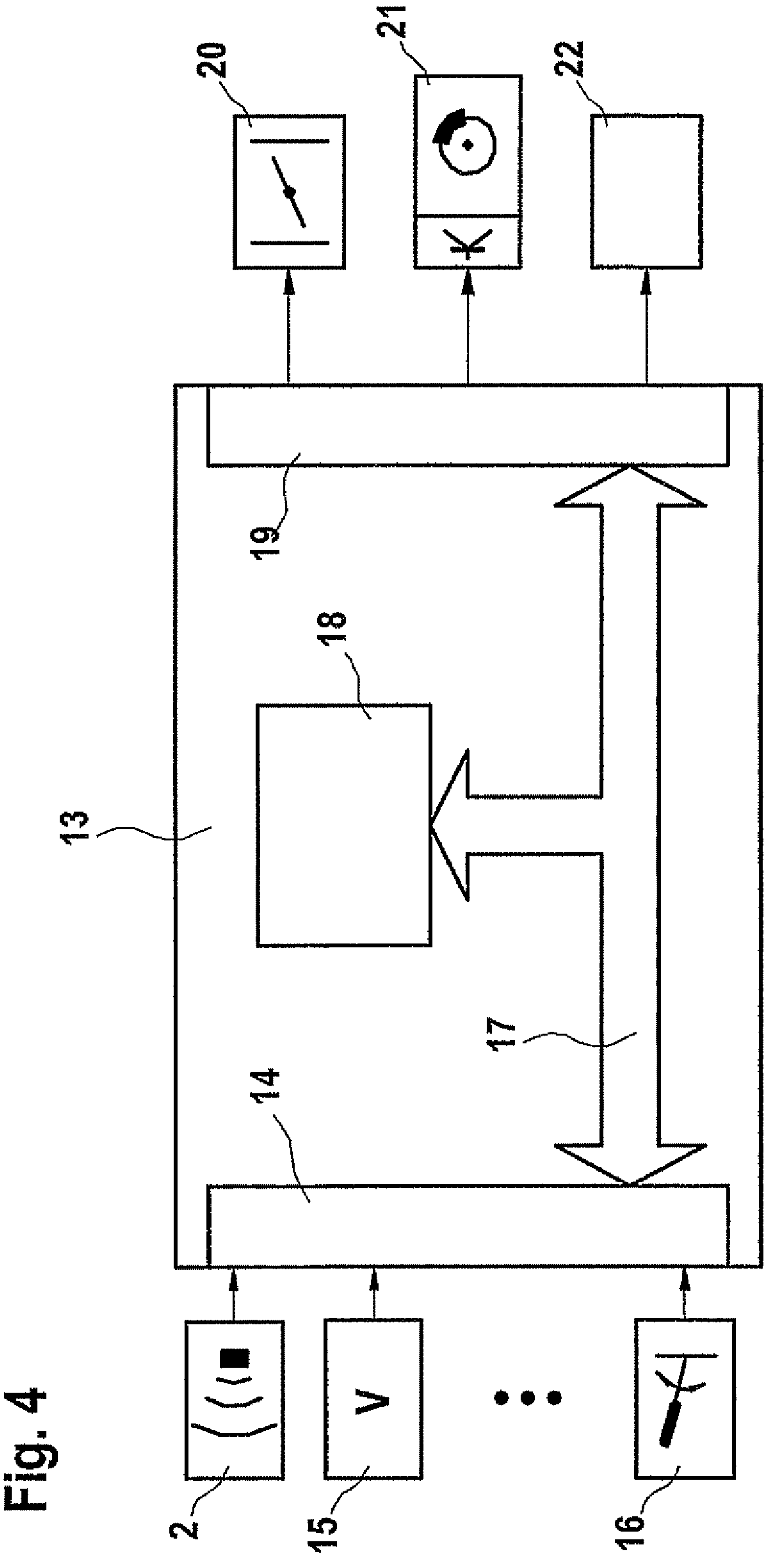
FIG. 4 is a block diagram of an example embodiment of the apparatus according to the present invention.

FIG. 4 is a block diagram of an embodiment of the apparatus according to the present invention. Adaptive distance and speed controller 13, which encompasses a input circuit 14, is shown. Input variables are conveyed to adaptive distance and speed controller 13 via input circuit 14. These input variables derive, for example, from an object detection system 2 that can be embodied as a radar, laser, ultrasonic, or video system, or a combination thereof. This object detection system 2 is mounted at the front of the vehicle and possesses a sensor field of view as shown in FIG. 3. This object detection system 2 detects objects and determines their distance from host vehicle 1, the relative speed Vrel of the object with respect to host vehicle 1, and the azimuth angle at which the object was detected with respect to longitudinal vehicle axis 3. From these variables conveyed to input circuit 14, the adaptive distance and speed controller can calculate the absolute speed of the detected objects as well as their lateral transverse offset q. The speed V of host vehicle 1 is also delivered to input circuit 14 via a speed sensor 15. A knowledge of the host-vehicle speed V is important for the controller, since it is only in combination with the host-vehicle speed that the absolute speed of the detected object can be calculated from its relative speed Vrel. It is moreover possible to convey further signals to input circuit 14, for example signals from an operating device 16 with which adaptive distance and speed controller 13 can be switched on and off and system settings can be modified and implemented. The signals conveyed to input circuit 14 are conveyed via a data exchange device 17 to a calculation device 18. In calculation device 18, actuating variables are calculated from the input signals and can be outputted to downstream actuating elements 20, 21, 22. Calculation device 18 additionally determines, from the signals conveyed via input circuit 14, whether host vehicle 1 is currently traveling on a one-land road or on a multi-lane road, and, in the latter case, the lane of the multi-lane road in which host vehicle 1 is traveling. The actuating signals ascertained by calculation device 18 are delivered via data exchange device 17 to an output circuit 19. Output circuit 19, for example, outputs an acceleration signal to a power-determining actuating element 20 of a drive device. This can be, for example, an electrically controllable throttle valve of an internal combustion engine, or a fuel quantity metering device of a reservoir injection system or a control rod of an injection pump. It is has been determined by calculation device 18, on the basis of the input signals, that host vehicle 1 is to be accelerated, an acceleration request signal is outputted to the power-determining actuating element 20. If calculation device 18 determines, on the basis of the input signals, that host vehicle 1 is to be decelerated, for example because a slower preceding vehicle is present, a deceleration signal is then outputted through output circuit 19 to deceleration devices 21 of the vehicle. Deceleration devices 21 can be, for example, an electrically activatable hydraulic braking system or a directly electrically controllable braking system of a motor vehicle. An adjustment signal for the field of view of object detection system 2 is additionally outputted via output circuit 19. If calculation device 18 has recognized, on the basis of the input signals conveyed to it, a vehicle situation in which expanded left field of view 11 or expanded right field of view 12 or both expanded fields of view are to be activated, an adjustment signal is then outputted via output circuit 19 to adjustment device 22 for the field of view, which modifies object detection sensor 2 in accordance with the information in FIG. 3. Expanded left field of view 11 or expanded right field of view 12 or both expanded fields of view can likewise be correspondingly deactivated by calculation device 18 on the basis of the vehicle situation recognized from the input signals conveyed to it.

What is claimed is:

1. A method for providing lane recognition for a controlled vehicle equipped with an adaptive distance and speed control system and traveling on a road, comprising:

transmitting to the adaptive distance and speed control system, using an object detection system, a relative speed of a detected object with respect to the controlled vehicle;

transmitting to the adaptive distance and speed control system: a) a variable for determining a lateral offset of the detected object with respect to the longitudinal vehicle axis of the controlled vehicle; and b) the speed of the controlled vehicle;

determining, based on the relative speed of the detected object with respect to the controlled vehicle and the speed of the controlled vehicle, whether the detected object is one of oncoming, stationary, and moving in the same direction as the controlled vehicle;

determining, using the lateral offset of the detected object with respect to the longitudinal vehicle axis of the controlled vehicle, the number of lanes present on the road and the lane in which the controlled vehicle is currently traveling; and adjusting a detection region of the object detection system based on the determined lane.

2. The method as recited in claim 1, wherein the determination of the number of lanes present on the road and the lane in which the controlled vehicle is currently traveling becomes effective only when determination results remain unchanged for a predetermined period of time.

3. A system for providing lane recognition for a controlled vehicle traveling on a road, comprising:

an object detection system for detecting and transmitting a relative speed of a detected object with respect to the controlled vehicle, and a variable for determining a lateral offset of the detected object with respect to the longitudinal vehicle axis of the controlled vehicle;

a speed sensor for detecting and transmitting the speed of the controlled vehicle;

an adaptive distance and speed control system including a calculation unit for determining, based on the relative speed of the detected object with respect to the controlled vehicle and the speed of the controlled vehicle, whether the detected object is one of oncoming, stationary, and moving in the same direction as the controlled vehicle, the calculation unit also determining the lateral offset of the detected object with respect to the longitudinal vehicle axis of the controlled vehicle, and the calculation unit further determining, using the lateral offset of the detected object with respect to the longitudinal vehicle axis of the controlled vehicle, the number of lanes present on the road and the lane in which the controlled vehicle is currently traveling; and an adjustment unit for adjusting a detection region of the object detection system based on the determined lane.

4. The system as recited in claim 3, wherein the object detection system includes at least one of a radar sensor, a laser sensor, an ultrasonic sensor, and a video sensor.

5. The system as recited in claim 3, wherein the determination of the number of lanes present on the road and the lane in which the controlled vehicle is currently traveling becomes effective only when determination results remain unchanged for a predetermined period of time.

* * * * *